No. 841,874. PATENTED JAN. 22, 1907.
C. DE KANDÓ.
ROTARY CURRENT MOTORS CONNECTED IN CASCADE SYSTEM.
APPLICATION FILED OCT. 14, 1903.

2 SHEETS—SHEET 1.

Witnesses:
J. Maynard
M. McAleer

Inventor:
Coloman de Kandó.
By Marion & Marion
Attorneys.

UNITED STATES PATENT OFFICE.

COLOMAN DE KANDÓ, OF BUDAPEST, AUSTRIA-HUNGARY, ASSIGNOR TO WESTINGHOUSE MACHINE COMPANY, A CORPORATION OF PENNSYLVANIA.

ROTARY CURRENT-MOTOR CONNECTED IN CASCADE SYSTEM.

No. 841,874.   Specification of Letters Patent.   Patented Jan. 22, 1907.

Application filed October 14, 1903. Serial No. 177,085.

*To all whom it may concern:*

Be it known that I, COLOMAN DE KANDÓ, engineer, residing at Budapest, in the Empire of Austria-Hungary, have invented certain new and useful Improvements in or Relating to Rotary Current-Motors Connected in Cascade System, of which the following is a specification.

Hitherto a group of collector-rings has been used in connection with each of the two rotary current-motors employed in the cascade system. The function of the rings arranged on the primary motor is either to supply the current derived from the supply-conductor to the primary coil of this motor or else to supply the current induced in the secondary coil of the motor to the inducing part of the secondary motor, the latter function lasting for a period at the end of which the lower phase of speed is reached—i. e., during the first period or the start. Subsequently these collector-rings are destined to conduct the current induced in the secondary part of the primary motor into a resistance instead of to the secondary motor until a higher phase of speed is attained—i. e., during the second period of the start. The collector-rings of the secondary motor, however, serve either for the introduction of the inducing-current into the motor or for the introduction of the induced current into the resistance.

In railway-vehicles it is often advantageous to mount both motors on the same axle, whereby the two groups of collector-rings require an increased space in a place already narrow and restricted.

Figure 1:
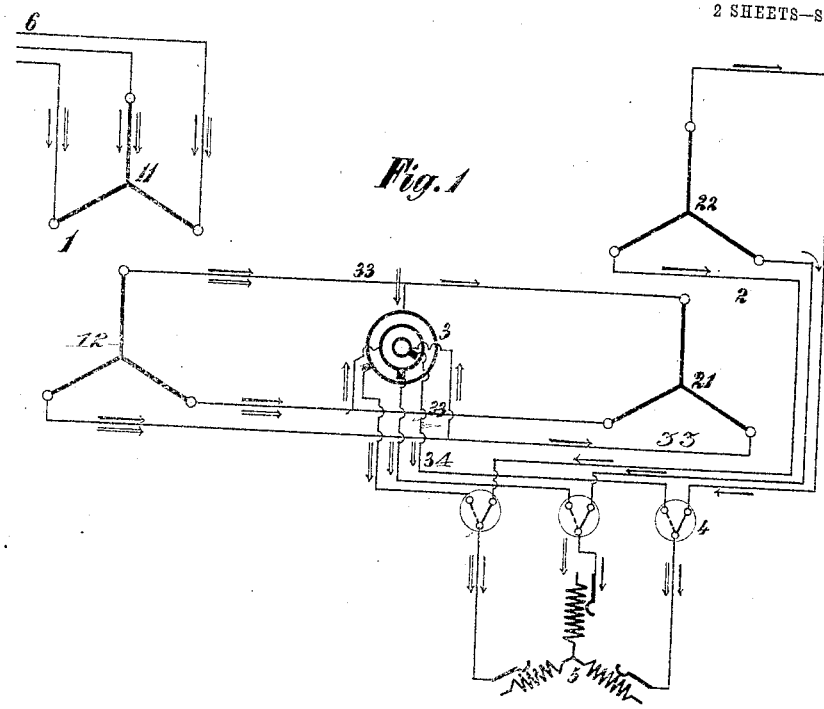
Figure 2:
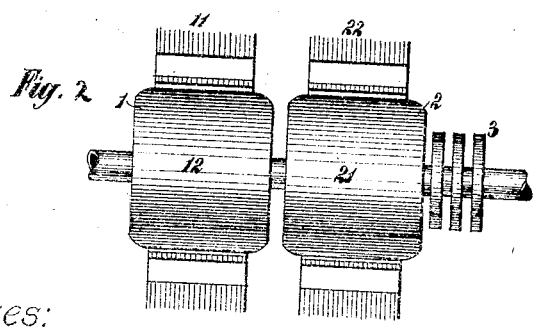
Figure 3:
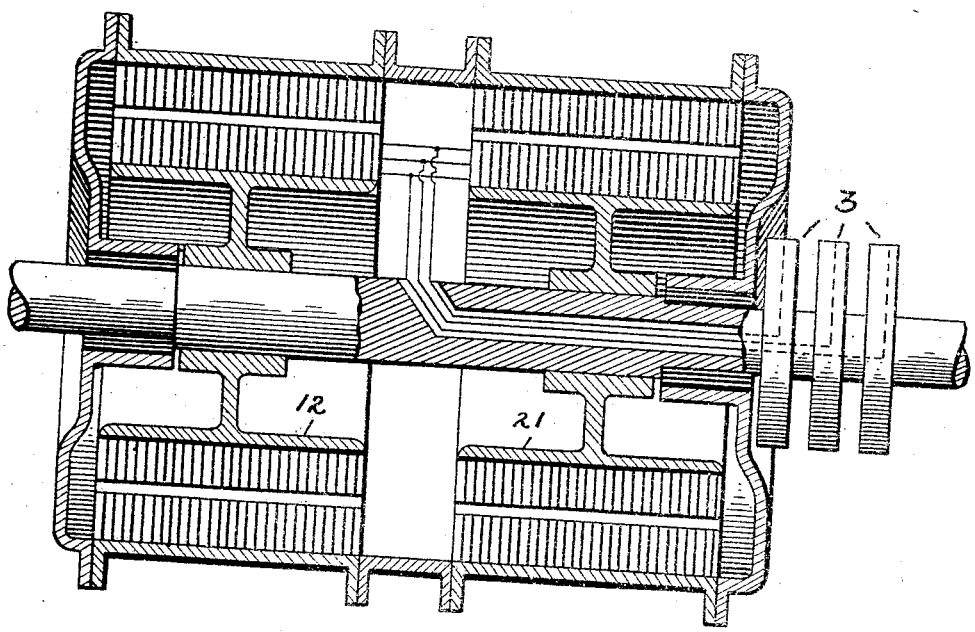

An arrangement involving my invention is diagrammatically shown in Figure 1 of the accompanying drawings, while Fig. 2 shows the arrangement of the collector-rings. Fig. 3 is a cross-sectional view of the part shown in Fig. 2, showing the wires connecting the rotors with the collector-ring.

In the figures like reference-numerals indicate like parts of the device as follows:

1 is the primary motor.
2 is the secondary motor.
3 is the group of collector-rings.
11 is the stator of the primary motor or its inducing-coil.
12 is the rotor of the primary motor or the induced coil of the latter.
21 is the rotor of the secondary motor or its inducing-coil.
22 is the stator of the secondary motor or its induced coil.
33 represents the connecting-conductors between the rotor-coils.
4 is a commutator adapted to switch the starting resistance 5 from stator 22 to rings 3. 34 represents the conductors leading from said resistance to said stator and rings, and 6 is the supply-conductor from the electric source.

In Fig. 1 the single arrows indicate the course of the current in the first period of the start and the double arrows the course in the second period of the start and during full speed. The arms of the commutator-lever 4 are in the first period shown in full lines, while the dotted lines indicate the second period.

As can be seen from Fig. 1, the collector-rings 3 have no function in the first period of the start, owing to the brushes having no connection with the starting resistance. During this period the current induced in rotor 12 passes directly into the rotor 21 and only the secondary current induced by this current in the stator 22 passes through the commutator 4 to the resistance 5. In the second period of the start, however, the current coming from the rotor 12 flows through the collector-rings 3 and through their brushes to the commutators 4 and thence to the resistance 5, while only the magnetizing-current of the motor 2 passes into the rotor 21. On lessening the resistance 5 the intensity of the current circulating in the rotor 21 is also diminished and no current flows to the rotor 21 when the resistance is short-circuited.

This arrangement allows the collector-rings of the secondary motor to be suppressed, whereby more room is gained for the arrangement of the motors, while, moreover, the contact resistance, if occurring in the rings, is lessened. The maintenance is much simplified, owing to the suppression of one of the parts requiring attention.

The rings are arranged on one side of the two motors, as shown in Fig. 2. In this case the connecting-wires are situated between the rotors 12 and 21 and pass internally through the rotor 21 to the collector-rings, as shown in Fig. 3. This location of the collector-rings and arrangement of parts economizes space between the axle-bearings and affords an opportunity for locating the rings where they are readily accessible for inspection and repairs.

The conductors 6, which feed the motor 1, lead from any suitable source of power, either directly or through another motor in case the system comprises more than two.

Having now described my invention, what I claim, and desire to secure by Letters Patent, is—

In a system of electric traction a plurality of rotary current-motors with their rotors on the same driving-axle, and a single set of collector-rings located outside the motors, to which rings the windings of both motors are connected, and connections leading through one of the motors to said collector-rings.

In witness whereof I have hereunto set my hand in the presence of two witnesses.

COLOMAN DE KANDÓ.

Witnesses:
 EUGENE HARSAINY,
 F. LA GUARDIA.